US008607223B2

(12) United States Patent  (10) Patent No.: US 8,607,223 B2
Fors et al.  (45) Date of Patent: Dec. 10, 2013

(54) CREATING MULTIPLATFORM CUSTOMIZED INSTALL PACKAGES FOR SOFTWARE INSTALLATION

(75) Inventors: Tim A. Fors, Toronto (CA); Cindy J. Luk, Maple (CA); Candy K. Y. Ng, Scarborough (CA); Barbara C. Y. Wong, North York (CA)

(73) Assignee: International Business Machines Corporation, Armonk, NY (US)

( * ) Notice: Subject to any disclaimer, the term of this patent is extended or adjusted under 35 U.S.C. 154(b) by 2121 days.

(21) Appl. No.: 11/460,737

(22) Filed: Jul. 28, 2006

(65) Prior Publication Data

US 2008/0028390 A1    Jan. 31, 2008

(51) Int. Cl.
*G06F 9/44* (2006.01)
*G06F 9/445* (2006.01)

(52) U.S. Cl.
USPC .................. 717/174; 717/168; 717/175

(58) Field of Classification Search
None
See application file for complete search history.

(56) References Cited

U.S. PATENT DOCUMENTS

| | | | | |
|---|---|---|---|---|
| 5,966,540 A * | 10/1999 | Lister et al. | ................... | 717/174 |
| 6,269,480 B1 | 7/2001 | Curtis | | |
| 6,347,397 B1 | 2/2002 | Curtis | | |
| 6,374,401 B1 * | 4/2002 | Curtis | .......................... | 717/175 |
| 6,385,766 B1 * | 5/2002 | Doran et al. | ................... | 717/174 |
| 6,442,754 B1 | 8/2002 | Curtis | | |
| 6,536,040 B1 | 3/2003 | Curtis | | |
| 6,598,225 B1 | 7/2003 | Curtis et al. | | |
| 6,601,236 B1 | 7/2003 | Curtis | | |
| 7,032,220 B2 * | 4/2006 | Curtis | .......................... | 717/174 |
| 7,266,817 B1 * | 9/2007 | Barrett | .......................... | 717/174 |
| 7,499,933 B1 * | 3/2009 | Simpson | ............................... | 1/1 |
| 7,669,201 B2 * | 2/2010 | Seely | ............................ | 717/178 |
| 8,136,100 B1 * | 3/2012 | Goldman | ....................... | 717/168 |
| 8,171,470 B2 * | 5/2012 | Goldman et al. | ............ | 717/168 |
| 8,286,174 B1 * | 10/2012 | Schmidt et al. | ............... | 718/104 |
| 8,332,841 B2 * | 12/2012 | Funk et al. | .................... | 717/174 |
| 8,438,559 B2 * | 5/2013 | Naslavsky et al. | ............ | 717/175 |
| 2002/0144248 A1 * | 10/2002 | Forbes et al. | ................. | 717/167 |
| 2003/0101250 A1 * | 5/2003 | Sweitzer et al. | ............. | 709/223 |
| 2003/0208685 A1 * | 11/2003 | Abdel-Rahman | ............ | 713/191 |
| 2004/0060035 A1 * | 3/2004 | Ustaris | .......................... | 717/100 |
| 2004/0088698 A1 * | 5/2004 | Claiborne | ..................... | 717/174 |
| 2004/0117338 A1 * | 6/2004 | Kennedy et al. | .................. | 707/1 |
| 2005/0055692 A1 * | 3/2005 | Lupini et al. | .................. | 717/174 |
| 2005/0108181 A1 * | 5/2005 | Butler et al. | .................... | 706/46 |

(Continued)

OTHER PUBLICATIONS

Karandikar et al., "Building Multi-platform Images for Deploying Oss on Dell Business Client Systems", Aug. 2011, Dell, pp. 1-14; <en.community.dell.com/techcenter/extras/m/white.../download.aspx>.*

Fischer et al., "Engage: A Deployment Management System", 2012 ACM, PLDI'12, Jun. 11-16, 2012, Beijing, China, pp. 263-273; <http://dl.acm.org/citation.cfm?doid=2254064.2254096>.*

Ohrt et al., "Cross-Platform Development Tools for Smartphone Applications", 2012 IEEE, pp. 72-79; <http://ieeexplore.ieee.org/stamp/stamp.jsp?tp=&arnumber=6178193>.*

(Continued)

*Primary Examiner* — Thuy Dao
*Assistant Examiner* — Ben C Wang
(74) *Attorney, Agent, or Firm* — Patents On Demand; Brian K. Buchheit; Scott M. Garrett

(57) ABSTRACT

Methods, systems and computer program products for multi-platform installation of a customized install package (CIP). In one embodiment of the invention, a multi-platform component installation package is provided which includes components sufficient to assemble complete installation images for installation onto different specified target systems of respective different platform types, and selected ones of the components are assembled together so as to assemble a complete installation image for installation onto a specific one of the different specified target systems.

20 Claims, 2 Drawing Sheets

(56) References Cited

U.S. PATENT DOCUMENTS

| | | | |
|---|---|---|---|
| 2005/0125788 A1* | 6/2005 | Lupini et al. | 717/168 |
| 2006/0080638 A1* | 4/2006 | Fiore | 717/104 |
| 2006/0123414 A1* | 6/2006 | Fors et al. | 717/177 |
| 2006/0277542 A1* | 12/2006 | Wipfel | 717/174 |
| 2007/0256072 A1* | 11/2007 | Barr et al. | 717/174 |
| 2008/0127171 A1* | 5/2008 | Tarassov | 717/174 |
| 2009/0094596 A1* | 4/2009 | Kuiper et al. | 717/174 |
| 2009/0158270 A1* | 6/2009 | Funk et al. | 717/174 |
| 2010/0162201 A1* | 6/2010 | Shnaiderman et al. | 717/174 |
| 2013/0167136 A1* | 6/2013 | Goldman | 717/175 |

OTHER PUBLICATIONS

Herzog, G. et al; Multiplatform Testbed: An Integration Platform for Multilmodal Dialog Systems; ACM Digital Library; 2001.

Clerckx, T., et al; The Mapping Problem Back and Forth: Customizing Dynamic Models While Preserving Consistency; ACM Digital Library; 2004.

Dutta, A., et al; MarconiNet Supporting Streaming Media Over Localized Wireless Multicast; ACM Digital Library; 2002.

Zhang, Q., et al; Automated Workplace Design and Reconfiguration for Evolving Business Processes; ACM Digital Library; 2005.

* cited by examiner

CREATING MULTIPLATFORM CUSTOMIZED INSTALL PACKAGES FOR SOFTWARE INSTALLATION

BACKGROUND OF THE INVENTION

1. Field of the Invention

The present invention relates to the field of application installation and more particularly to application installers.

2. Description of the Related Art

Though often overlooked, application installation is a prerequisite to interacting with a software application. Specifically, in most circumstances, an application can be properly executed only subsequent to the completion of a successful installation process. At the minimum, a typical software application installation requires a transfer of files to the file structure of a computing system, and the configuration of the computing system to particularly interact with the software application. Ordinarily, the configuration of the computing system includes the addition or modification of registry settings, the addition or modification of entries to one or more initialization files, or both.

Typically, software programs include as a component installer logic having program code enabled to substantially automate the installation process. In addition, computer operating systems occasionally incorporate installer logic for use in installing drivers or other software. Likewise, many commercial software offerings are provided with companion updater logic supporting self-updating operations. Generally, the updater logic can be included as a component of the software program itself, or the updater logic can be provided externally as a third-party tool.

The provision of an updating process is desirable because software programs are frequently modified by end users, for example by applying bug fixes or enhancements (such as new versions of the software). There are many different processes for installing and/or updating software programs. Some processes are entirely automated and substantially invisible to the user, while other processes are better characterized as interactive. Some processes are known to be complex while other processes are viewed to be simpler in nature.

Software programs used to install new software, to install updates to software, and to uninstall (remove) software are referred to herein as "installer applications". The term "installer applications" is intended to encompass both stand-alone software programs that can be used to install a variety of software applications (for example, such as installers that may be provided with an operating system), as well as software programs that are adapted to install only a single software application (and may be integrated with the installation file package for that software application). Installer applications, when run, implement a software installation process.

The great disparity in the nature of different installer applications provides for challenges in the computing enterprise. Specifically, from the development and deployment perspective, each new application generally requires a custom installer for each target platform. Furthermore, most installers only can support a single platform type and the presence of multiple platforms within the enterprise, therefore, requires multiple different installers. Consequently, the deployment of a maintenance update in the enterprise to multiple different platforms (including different supporting operating systems) can require the execution of multiple different installers.

BRIEF SUMMARY OF THE INVENTION

Embodiments of the present invention address deficiencies of the art in respect to multiple platforms and provide a novel and non-obvious method, system and apparatus for multi-platform installation of a customized install package (CIP). In one embodiment of the invention, a software installation method can be provided. The method can include providing a multi-platform component installation package including components sufficient to assemble complete installation images for installation onto different specified target systems of respective different platform types. For instance, the multi-platform component installation package can be provided from a single media source. The method further can include assembling selected ones of the components to assemble a complete installation image for installation onto a specific one of the different specified target systems.

In one aspect of the embodiment, the method further can include grouping a set of install launchers each specific to a different platform type; further grouping a set of component maps each specific to a different platform type, and storing both common components common to all platform types and native components each specific to a particular platform type. In consequence, the grouping and storing can form the component installation package. Optionally, an installer and a corresponding component map can be selected for a particular platform type of a target system and persisted along with the requisite common and native components for the particular platform type for subsequent use for other target systems of the same platform type.

In another aspect of the embodiment, tailoring the multi-platform component installation package according to the particular platform type for installation onto the specified target system can include determining the particular platform type for the specified target system and selecting each of an install launcher and a component map for the particular platform type. For example, determining the particular platform type for the specified target system can include detecting an operating system type for the specified target system, or receiving an indication of the platform type for the specified target system. In any event, both the common components and native components for the particular platform type further can be selected for installation onto the specified target system in locations specified by the selected component map utilizing the selected install launcher.

In another embodiment of the invention, a software installation data processing system can be provided. The system can include a single install factory tool including program code enabled to assemble into a complete installation image for installation a specific specified target system, selected components from among a multiplicity of components for multiple target systems of corresponding different platform types. In one aspect of the embodiment, the program code can be embodied within a multi-platform plug-in.

As such, in another aspect of the embodiment, the system further can include a single platform plug-in including program code enabled to generate a single installation image corresponding to a specific target platform type. Finally, in yet another aspect of the embodiment, the data processing system can be provided with access to one or more repositories comprising a set of install launchers each specific to a particular platform type, common components for all platform types and native components specific to a particular platform type, and a set of component maps each specific to a particular platform type.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for multi-platform software installation. In accordance with an embodiment of the present invention, a complete installation image for an application can be generated from a single installer for different disparate target platforms from a single media source according to a specified platform identity for a target computing system Once the installation image has been generated, the installation image can be copied to permanent storage accessible by the target computer system. In this way, the process of installing software in a multi-platform heterogeneous environment can be reduced to a single installer and a single media source for all installation packages for all target platforms.

Figure 1:
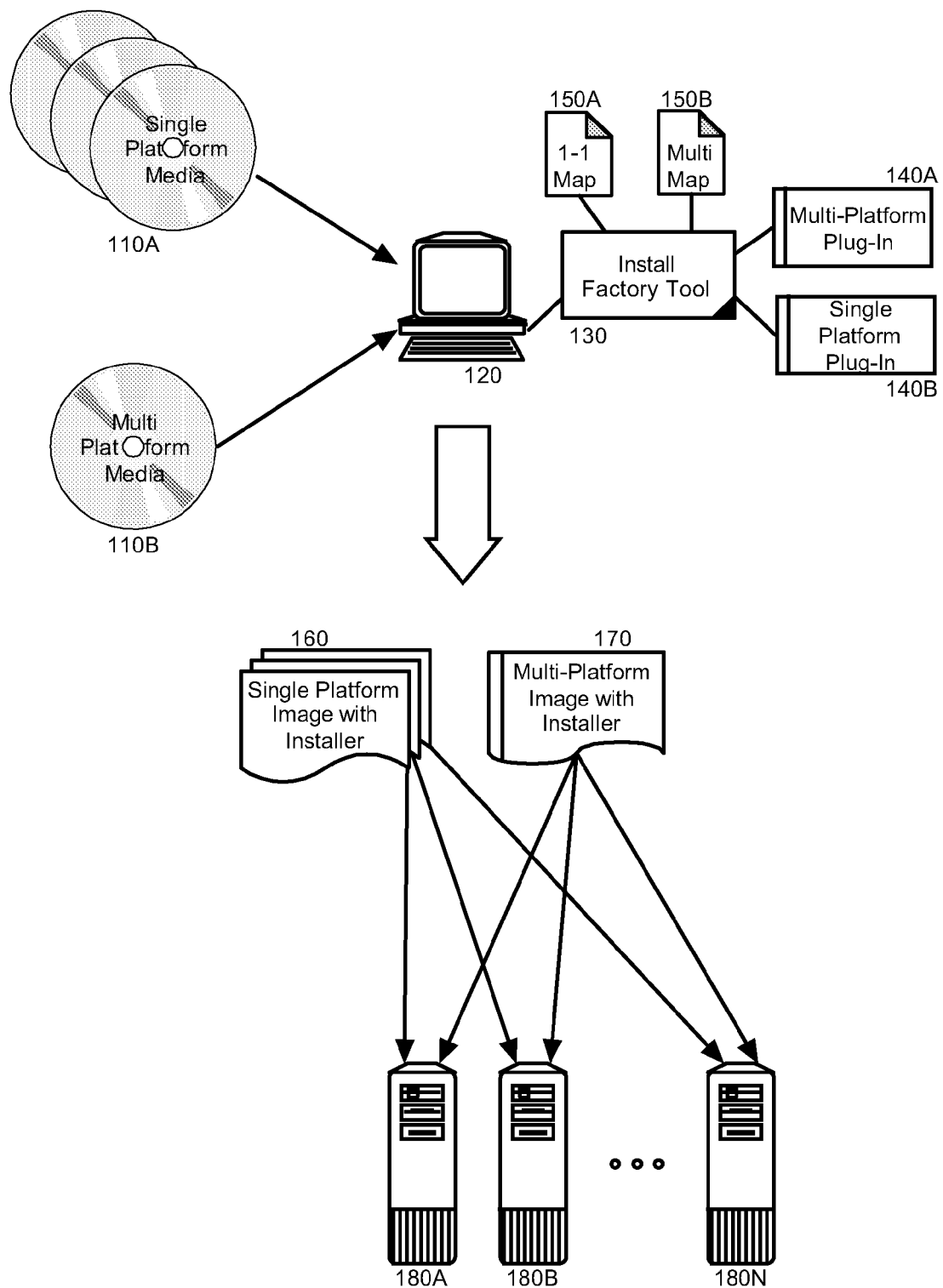
FIG. 1 is a pictorial illustration of an installation data processing system configured for multi-platform software installation.

In illustration, FIG. 1 is a pictorial illustration of an installation data processing system configured for multi-platform software installation. The system can include a host computing device 120 in which an installation image for a software application can be generated. The host computing device can include an install factory tool 130 coupled to each of a multi-platform plug-in 140A and a single platform plug-in 140B. The install factory tool 130 further can be coupled to a one-to-one component map 150A and a multi-platform component map 150B. The one-to-one component map 150A can map the identity and location of a component for installation in single platform media 110A to an installation location in one of the target platforms 180A, 180B, 180N. Likewise, the multi-platform component map 150B can map the identity and location of a component for installation in a multi-platform media 110B to an installation location in one or more of the target platforms 180A, 180B, 180N.

The install factory tool 130 can include program code enabled to process single platform media 110A and multi-platform media 110B. In this regard, the install factory tool 130 can process single platform media 110A conventionally through the single platform plug-in 140B to conventionally generate individual single platform images 160 for installation onto a corresponding one of the target platforms 180A, 180B, 180N. In this regard, the install factory tool 130 can select components for inclusion in the single platform image 160 along with a one-to-one mapping 150A of components to component locations in the corresponding one of the target platforms 180A, 180B, 180N.

In addition to the single platform media 110A, however, the install factory 130 further can process a multi-platform media 110B through multi-platform plug-in 140A to generate a single, multi-platform image 170. In the latter circumstance, the multi-platform media 110A can act as a single source of installation for multiple different ones of the target platforms 180A, 180B, 180N. In this regard, the install factory tool 130 can select components for inclusion in the multi-platform image 170 along with a multi-platform mapping 150B of components to component locations in the correspondingly different ones of the target platforms 180A, 180B, 180N.

Figure 2:
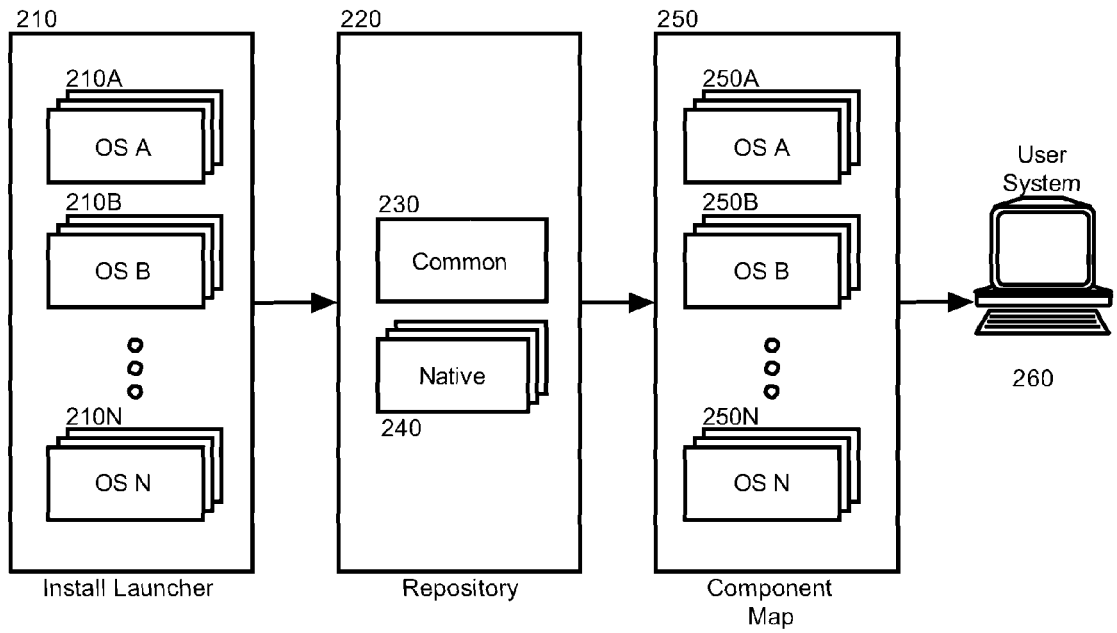
FIG. 2 is a schematic illustration of an installation data processing system configured for multi-platform software installation.

In further illustration of the operation of the installation data processing system of FIG. 1, FIG. 2 is a schematic illustration of an installation data processing system configured for multi-platform software installation. As shown in FIG. 2, the installation process can be bi-furcated into an image generation process and an image deployment process. In the image generation process, installation images may be generated for installation onto multiple, different ones of a set of disparate target platforms.

Specifically, multiple different install launchers 210A, 210B, 210N can be grouped behind a single install launcher interface 210 in the single media source. A repository 220 can be established to include both common components 230 common to all installation images for all different target platforms, and also native components 240 that are specific to particular installation images for specific target platforms. Optionally, each of the native components 240 can be referenced according to file name, target platform and target platform architecture to provide a readily identifiable association between the native components 240 and the target platform.

Finally, a component mapping 250 can be established containing component maps 250A, 250B, 250N for different, respective target platforms. At install time, a platform type for a target system 260 can be specified in response to which a corresponding one of the install launchers 210A, 210B, 210N can be selected for grouping an installation image for the specified platform type. Subsequently, the requisite components among the common components 230 can be selected for grouping into an installation image along with those native components 240 specific to the specified platform type. Finally, a pertinent one of the component mappings 250A, 250B, 250N can be selected mapping the components in the installation image to the proper location in the target system 260. Thereafter, the installation image can be moved to the target system and installed onto the target system.

Figure 3:
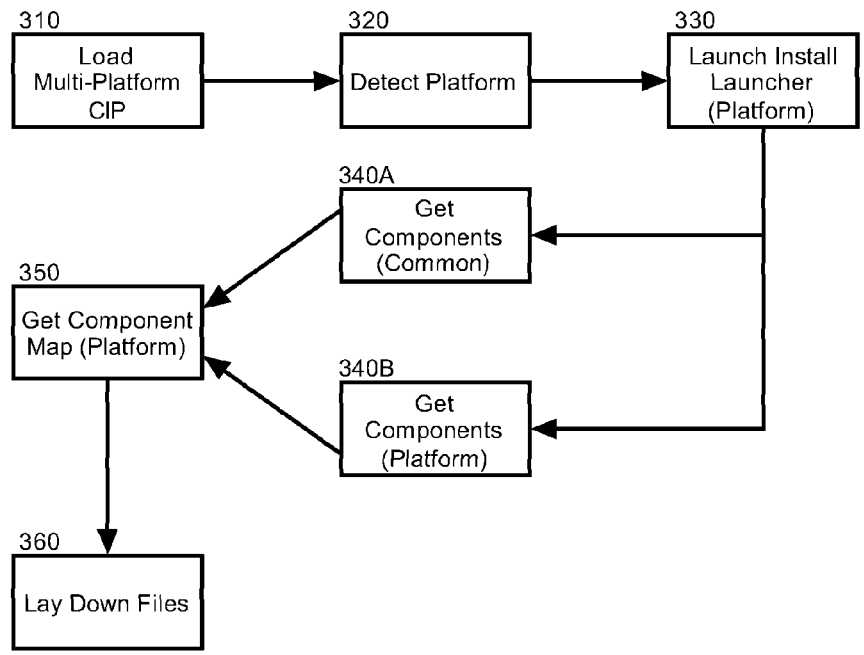
FIG. 3 is a flow chart illustrating a process for multi-platform software installation.

In yet further illustration of a platform specific software installation, FIG. 3 is a flow chart illustrating a process for multi-platform software installation. Beginning in block 310, a multi-platform component install package can be retrieved, optionally from a single media source, and loaded for processing onto a target platform having a specific platform type. In block 320, the platform type can be determined, for example by software and/or hardware detection methods, or by way of user input, and in block 330, an install launcher for the detected platform type can be located in the single media source and loaded for operation.

In blocks 340A and 340B, the common components common to all platform types and native components specific to the detected platform type can be retrieved for installation onto the target platform. Thereafter, in block 350, a map for the detected platform can be retrieved. Finally, in block 360, the files making up the retrieved components can be written to the target platform at locations specified according to the retrieved mapping. In this way, multiple different platform types can be accommodated via a single install factory tool.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A software installation method executed by a processor comprising:
   providing a multi-platform component installation package comprising components sufficient to assemble complete installation images for installation onto different specified target systems of respective different platform types;
   storing both common components common to all platform types and native components each specific to a particular platform type;
   grouping a plurality of component maps each specific to a different platform type, wherein each component map specifies the stored ones of the common components and the stored ones of the native components used for a corresponding one of the specific target systems; and,
   grouping a plurality of install launchers each specific to a different platform type;
   the grouping and storing forming a component installation package;
   determining a particular platform type for the specific one for the different specified target systems;
   selecting each of an install launcher and a component map for the particular platform type; and
   assembling selected ones of the components to assemble the complete installation image for installation onto a specific one of the different specified target systems using the selected one of the component maps that corresponds to the specific one of the different specified target systems, wherein the complete installation image includes common components and native components for the particular platform type, wherein the complete installation image is stored on a non-transitory storage medium, wherein the complete installation image only includes a subset of the components of the multi-platform component installation package needed for the specific target system.

2. The method of claim 1, wherein providing a multi-platform component installation package comprising components sufficient to assemble complete installation images for installation onto different specified target systems of respective different platform types, comprises providing in a single media source a multi-platform component installation package comprising components sufficient to assemble complete installation images for installation onto different specified target systems of respective different platform types.

3. The method of claim 1, wherein assembling selected ones of the components to assemble a complete installation image for installation onto a specific one of the different specified target systems, comprises:
   further selecting both the common components and native components for the particular platform type for installation onto the specific one of the different specified target systems in locations specified by the selected component map utilizing the selected install launcher.

4. The method of claim 3, wherein determining the particular platform type for the specified target system, comprises determining a particular operating system type for the specified target system.

5. The method of claim 3, further comprising persisting the selected install launcher and component map, along with the further selected common components and native components for subsequent re-use in installing to other target systems of the particular platform type.

6. The method of claim 1, further comprising processing the assembled components to install software onto the specific one of the different specified target systems.

7. A software installation data processing system, comprising:
   at least one central processing unit; and
   one or more non-transitory storage medium storing program instructions that the at least one central processing unit executes, wherein execution of the program instructions causes the software installation data processing system to:
   provide a multi-platform component installation package comprising components sufficient to assemble complete installation images for installation onto different specified target systems of respective different platform types;
   store both common components common to all platform types and native components each specific to a particular platform type;
   group a plurality of component maps each specific to a different platform type, wherein each component map specifies the stored ones of the common components and the stored ones of the native components used for a corresponding one of the specific target systems;

group a plurality of installers each specific to a different platform type, wherein the grouping and storing forming a component installation package;

determine a particular platform type for the specific one of the different specified target systems;

select each of an install launcher and a component map for the particular platform type; and, further select both the common components and native components for the particular platform type for installation onto the specific one of the different specified target systems in locations specified by the selected component map utilizing the selected install launcher;

store the selected common components, the selected native components on a non-transitory storage medium as a complete installation image for the specific one of the different specific target system, wherein the complete installation image only includes a subset of the components of the multi-platform component installation package needed for the specific target system.

8. The system of claim 7, wherein the program code is embodied within a multi-platform plug-in.

9. The system of claim 8, further comprising a single platform plug-in comprising program code enabled to generate a single installation image corresponding to a specific target platform type from a single media source.

10. A computer program product comprising at least one non-transitory computer storage medium having computer usable program code for software installation, the computer program product including:

computer usable program code for providing a multi-platform component installation package comprising components sufficient to assemble complete installation images for installation onto different specified target systems of respective different platform types;

computer usable program code for storing both common components common to all platform types and native components each specific to a particular platform type;

computer usable program code for storing grouping a plurality of component maps each specific to a different platform type, wherein each component map specifies the stored ones of the common components and the stored ones of the native components used for a corresponding one of the specific target systems; and, computer usable program code for storing grouping a plurality of install launchers each specific to a different platform type, wherein the grouping and storing form a component installation package;

computer usable program code for storing determining a particular platform type for the specific one of the different specified target systems;

computer usable program code for storing selecting each of an install launcher and a component map for the particular platform type; and computer usable program code for storing assembling selected ones of the components to assemble the complete installation image for installation onto a specific one of the different specified target systems using the selected one of the component maps that corresponds to the specific one of the different specified target systems, wherein the complete installation image includes common components and native components for the particular platform type, wherein the complete installation image is stored on a non-transitory storage medium, wherein the complete installation image only includes a subset of the components of the multi-platform component installation package needed for the specific target system.

11. The computer program product of claim 10, wherein the computer usable program code for providing a multi-platform component installation package comprising components sufficient to assemble complete installation images for installation onto different specified target systems of respective different platform types, comprises computer usable program code for providing in a single media source a multi-platform component installation package comprising components sufficient to assemble complete installation images for installation onto different specified target systems of respective different platform types.

12. The computer program product of claim 11, wherein the computer usable program code for assembling selected ones of the components to assemble a complete installation image for installation onto a specific one of the different specified target systems, comprises:

computer usable program code for further selecting both the common components and native components for the particular platform type for installation onto the specific one of the different specified target systems in locations specified by the selected component map utilizing the selected install launcher.

13. The computer program product of claim 12, wherein the computer usable program code for determining the particular platform type for the specific one of the different specified target systems, comprises computer usable program code for determining a particular operating system type for the specific one of the different specified target systems.

14. The computer program product of claim 12, further comprising computer usable program code for persisting the selected install launch and component map, along with the further selected common components and native components for subsequent re-use in installing to other target systems of the particular platform type.

15. The computer program product of claim 10, further comprising computer usable program code for processing the assembled components to install software onto the specific one of the different specified target systems.

16. A software installation method executed by a processor comprising:

providing a multi-platform component installation package comprising components sufficient to assemble complete installation images for installation onto different specified target systems of respective different platform types;

storing both common components common to all platform types and native components each specific to a particular platform type;

grouping a plurality of component maps each specific to a different platform type, wherein each component map specifies the stored ones of the common components and the stored ones of the native components used for a corresponding one of the specific target systems;

grouping a plurality of installers each specific to a different platform type;

the grouping and storing forming a component installation package;

determining a particular platform type for the specific one of the different specified target systems;

selecting each of an install launcher and a component map for the particular platform type; and, further selecting both the common components and native components for the particular platform type for installation onto the specific one of the different specified target systems in locations specified by the selected component map utilizing the selected install launcher;

storing the selected common components, the selected native components on a non-transitory storage medium as a complete installation image for the specific one of the different specific target system, wherein the complete installation image only includes a subset of the components of the multi-platform component installation package needed for the specific target system.

17. The method of claim 16, wherein providing a multi-platform component installation package comprising components sufficient to assemble complete installation images for installation onto different specified target systems of respective different platform types, comprises providing in a single media source a multi-platform component installation package comprising components sufficient to assemble complete installation images for installation onto different specified target systems of respective different platform types.

18. The method of claim 16, wherein determining the particular platform type for the specified target system, comprises determining a particular operating system type for the specified target system.

19. A computer program product comprising a non-transitory computer storage medium having computer usable program code for software installation, the computer program product including:
  computer usable program code for providing a multi-platform component installation package comprising components sufficient to assemble complete installation images for installation onto different specified target systems of respective different platform types;
  computer usable program code for storing both common components common to all platform types and native components each specific to a particular platform type;
  computer usable program code for grouping a plurality of component maps each specific to a different platform type, wherein each component map specifies the stored ones of the common components and the stored ones of the native components used for a corresponding one of the specific target systems;
  computer usable program code for grouping a plurality of installers each specific to a different platform type;
  computer usable program code for forming a component installation package from the grouping and storing;
  computer usable program code for determining a particular platform type for the specific one of the different specified target systems, which comprises computer usable program code for determining a particular operating system type for the specified target system;
  computer usable program code for selecting each of an install launcher and a component map for the particular platform type;
  computer usable program code for further selecting both the common components and native components for the particular platform type for installation onto the specific one of the different specified target systems in locations specified by the selected component map utilizing the selected install launcher; and
  computer usable program code for creating and storing the selected common components, the selected native components on a non-transitory storage medium as a complete installation image for the specific one of the different specified target systems, wherein the complete installation image only includes a subset of the components of the multi-platform component installation package needed for the specific target system.

20. The computer program product of claim 19, wherein providing a multi-platform component installation package comprising components sufficient to assemble complete installation images for installation onto different specified target systems of respective different platform types, comprises providing in a single media source a multi-platform component installation package comprising components sufficient to assemble complete installation images for installation onto different specified target systems of respective different platform types.

* * * * *